(12) United States Patent
Niu

(10) Patent No.: US 11,272,059 B2
(45) Date of Patent: Mar. 8, 2022

(54) EXCLUSIVE AGENT POOL ALLOCATION METHOD, ELECTRONIC DEVICE, AND COMPUTER READABLE STORAGE MEDIUM

(71) Applicant: Ping An Technology (Shenzhen) Co., Ltd., Shenzhen (CN)

(72) Inventor: Hua Niu, Shenzhen (CN)

(73) Assignee: PING AN TECHNOLOGY (SHENZHEN) CO., LTD., Guangdong (CN)

( * ) Notice: Subject to any disclaimer, the term of this patent is extended or adjusted under 35 U.S.C. 154(b) by 610 days.

(21) Appl. No.: 16/315,255

(22) PCT Filed: Feb. 12, 2018

(86) PCT No.: PCT/CN2018/076564
§ 371 (c)(1),
(2) Date: Jan. 4, 2019

(87) PCT Pub. No.: WO2019/127875
PCT Pub. Date: Jul. 4, 2019

(65) Prior Publication Data
US 2021/0337069 A1    Oct. 28, 2021

(30) Foreign Application Priority Data
Dec. 25, 2017    (CN) .................... 201711430022.1

(51) Int. Cl.
*H04M 3/523*    (2006.01)
*G06Q 10/06*    (2012.01)
*H04M 3/51*    (2006.01)

(52) U.S. Cl.
CPC .. *H04M 3/5233* (2013.01); *G06Q 10/063112* (2013.01); *H04M 3/5175* (2013.01); *H04M 3/5191* (2013.01); *H04M 2203/401* (2013.01); *H04M 2242/15* (2013.01)

(58) Field of Classification Search
CPC ............. H04M 3/5233; H04M 3/5175; H04M 2242/15; H04M 2203/401; H04M 3/5191; G06Q 10/063112
(Continued)

(56) References Cited

U.S. PATENT DOCUMENTS

| | | | | |
|---|---|---|---|---|
| 2003/0018702 | A1* | 1/2003 | Broughton | H04M 3/523 709/202 |
| 2004/0054743 | A1* | 3/2004 | McPartlan | H04M 3/5235 709/206 |
| 2004/0141508 | A1* | 7/2004 | Schoeneberger | H04L 67/10 370/401 |

FOREIGN PATENT DOCUMENTS

| | | |
|---|---|---|
| CN | 104125349 A | 10/2014 |
| CN | 107135319 A | 9/2017 |

(Continued)

OTHER PUBLICATIONS

"Office Action dated Feb. 21, 2020 in JP Application 2018-560964" (Translation Provided), 9 Pages.
(Continued)

*Primary Examiner* — Thjuan K Addy
(74) *Attorney, Agent, or Firm* — NovoTechIP International PLLC

(57) ABSTRACT

An exclusive agent pool allocation method including collecting business data of agents; grouping agents according to the business data of the agents and forming multiple exclusive agent pools; calculating business skill values of agents according to the business data of the agents and classifying priorities of the agents; classifying priorities of agent pools according to the business data of the exclusive agent pools; and allocating calling user to the corresponding agent in the exclusive agent pool according to predetermined allocation strategy. The method solves the matching of the user and the agent in the region and the business level, allocates the agent
(Continued)

resource according to the priority of the business skill, realizes the high match between the business skill of the agent and the business handled by the user, improves the pertinence and effectiveness of the agent service and promotes the satisfaction of the users.

14 Claims, 7 Drawing Sheets

(58) Field of Classification Search
USPC ............ 379/265.12, 265.11, 265.05, 265.06, 379/265.01, 207.12, 266.1
See application file for complete search history.

(56) References Cited

FOREIGN PATENT DOCUMENTS

| | | |
|---|---|---|
| CN | 107360336 A | 11/2017 |
| JP | 2016-140066 A | 8/2016 |
| WO | 2017/100019 A1 | 6/2017 |
| WO | 2017100019 A1 | 6/2017 |

OTHER PUBLICATIONS

"Office Action dated May 5, 2019 in CN Application 201711430022.1" (Translation Provided), 5 Pages.
"Office Action dated Oct. 28, 2019 in CN Application 201711430022.1" (Translation Provided), 7 Pages.
"Office Action dated Apr. 8, 2020 in CN Application 201711430022.1" (Translation Provided), 17 Pages.
"PCT/ISA/220 dated Apr. 28, 2018 in PCT Application PCT/CN2018/076564" (Translation Provided), 10 Pages.
International Search Report issued in application No. PCT/CN2018/076564 dated Apr. 28, 2018.

* cited by examiner exclusive agent pool allocation system 20 data acquisition module
201 agent grouping module
202 agent priority classification module
203 agent pool priority classification module
204 agent pool allocation module
205

Fig. 4 agent priority classification module
203 first classification sub-module
2031 second classification sub-module
2032

Fig. 5 agent pool allocation module
205 first allocation sub-module
2051 second allocation sub-module
2052

Fig. 6

EXCLUSIVE AGENT POOL ALLOCATION METHOD, ELECTRONIC DEVICE, AND COMPUTER READABLE STORAGE MEDIUM

This application declares priority of the Chinese patent application with number CN2017114300221, file on Dec. 25, 2017, entitled "Exclusive agent pool allocation method, electronic device, and computer readable storage medium". Entire content of the Chinese patent application is incorporated in this application by reference.

BACKGROUND

1. Technical Field

The application relates to the field of personnel allocation, in particular to a method for allocating exclusive agent pool, an electronic device, and a computer readable storage medium.

2. Background Information

Agent service is an important way for the financial industry to provide service to customers through the call center system. The agent service is the process that agent staff provides the corresponding service to the customer through support system of call center. The traditional agent allocation method generally includes: 1) assigning to free agent first, that is, when receiving incoming call request, assigning the request to a free agent with no incoming task first; 2) assigning randomly, that is, if there are multiple incoming call requests and multiple free agents, the incoming call requests can be randomly selected and allocated to free agents randomly. Both of the two assigning manners cause differentiation in business matching between the incoming customer and the agent, leading that the agent cannot provide good business services for customers, resulting in degrade in service quality, and business management efficiency is low.

SUMMARY

To solve the problems, the application provides an exclusive agent pool allocation method, wherein the method comprises the following steps:

Step 01 of collecting business data of agents;

Step 02 of grouping agents according to the business data of the agents and forming multiple exclusive agent pools;

Step 03 of calculating business skill values of agents according to the business data of the agents and classifying priorities of the agents;

Step 04 of classifying priorities of agent pools according to the business data of the exclusive agent pools;

Step 05 of allocating calling user to the corresponding agent in the exclusive agent pool according to predetermined allocation strategy.

To realize above object, the application also provides an electronic device, comprising a memory and a processor, wherein the memory is adapted to store an exclusive agent pool allocation system executed by the processor, and the exclusive agent pool allocation system comprises:

a data acquisition module adapted to collect business data of agents;

an agent grouping module adapted to group agents according to the business data of the agents and form multiple exclusive agent pools;

an agent priority classification module adapted to prioritizing the agents according to the business data of the agents;

an agent pool priority classification module adapted to classify priorities of the agent pools according to the business data of the exclusive agent pools;

an agent pool allocation module adapted to allocate calling user to the agent with corresponding priority according to predetermined allocation policy.

To realize above object, the application also provides a computer readable storage medium, wherein the computer readable storage medium stores exclusive agent pool allocation system, and the exclusive agent pool allocation system can be executed by at least one processor to achieve the following steps:

Step 01 of collecting business data of agents;

Step 02 of grouping agents according to the business data of the agents and forming multiple exclusive agent pools;

Step 03 of calculating business skill values of agents according to the business data of the agents and classifying priorities of the agents;

Step 04 of classifying priorities of agent pools according to the business data of the exclusive agent pools;

Step 05 of allocating calling user to the corresponding agent in the exclusive agent pool according to predetermined allocation strategy.

Technical effects of this application are described as following.

According to location information of users and level of users, a dedicated agent pool matching therewith is set up, to solve the matching of users and agents in the region and business level, and agent resources are allocated according to the priority of business skills, to realize high matching between the business skill that the agent is good at and the business to be handled for the user, improve the pertinence and effectiveness of the agent service, and promote the satisfaction of the users.

BRIEF DESCRIPTION OF THE DRAWINGS

In order to more clearly illustrate the embodiments of the present application or the technical solutions in the prior art, the drawings to be used in the embodiments or the prior art description will be briefly described below. Obviously, the drawings in the following description are only some of the embodiments of the present application, and those skilled in the art can obtain other drawings based on these drawings without any creative work.

FIG. 4 shows a diagram of program modules of an exclusive agent pool allocation system according to an embodiment of the application;

FIG. 5 shows a diagram of program modules of an exclusive agent pool allocation system according to another embodiment of the application;

FIG. 6 shows a diagram of program modules of an exclusive agent pool allocation system according to another embodiment of the application;

DETAILED DESCRIPTION

The preferred embodiments of the application are described in detail below in conjunction with the accompanying drawings so that the advantages and characteristics of the application can be more easily understood by those skilled in the art and the scope of protection of the application can be more clearly defined.

Embodiment 1

Figure 1:
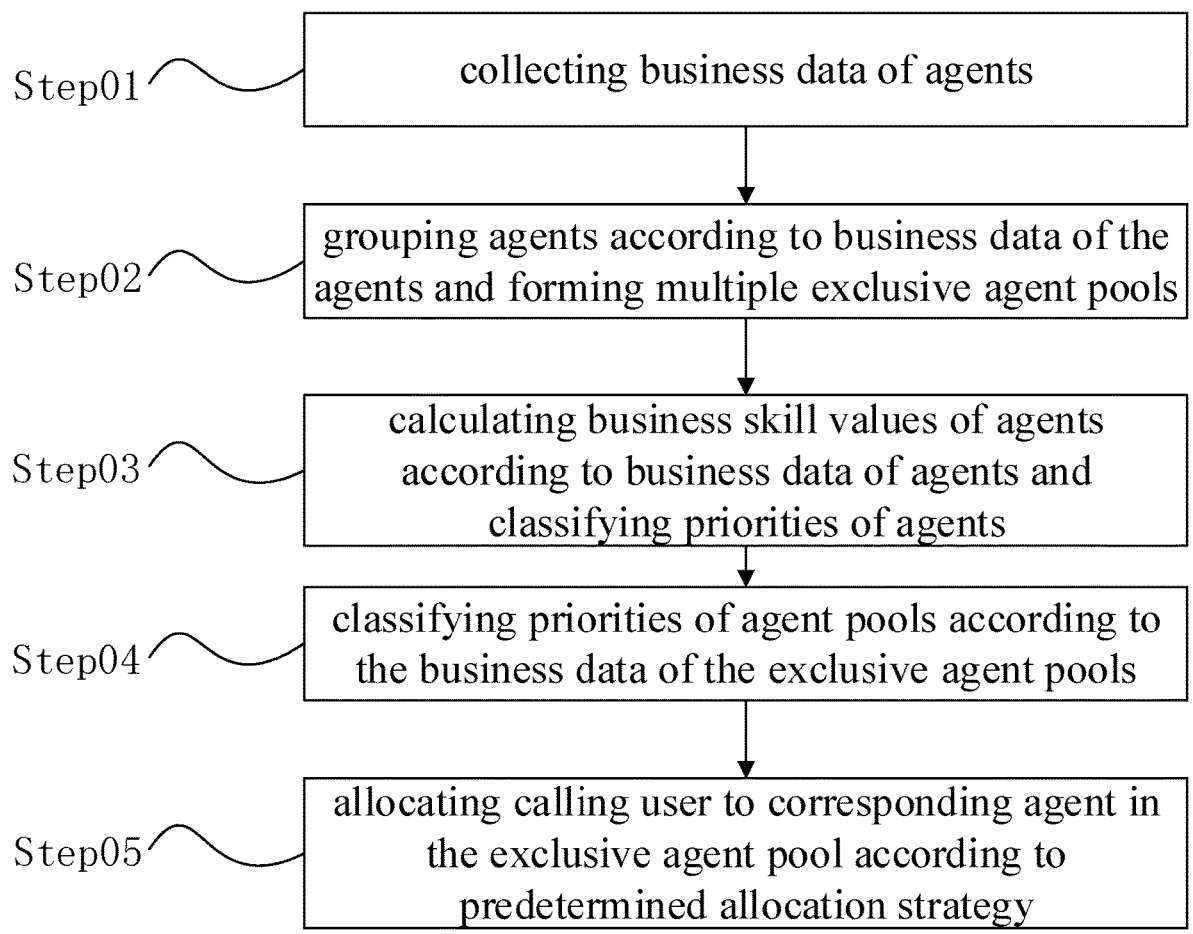
FIG. 1 shows a flowchart of an exclusive agent pool allocation method according to an embodiment of the application.
Figure 2:
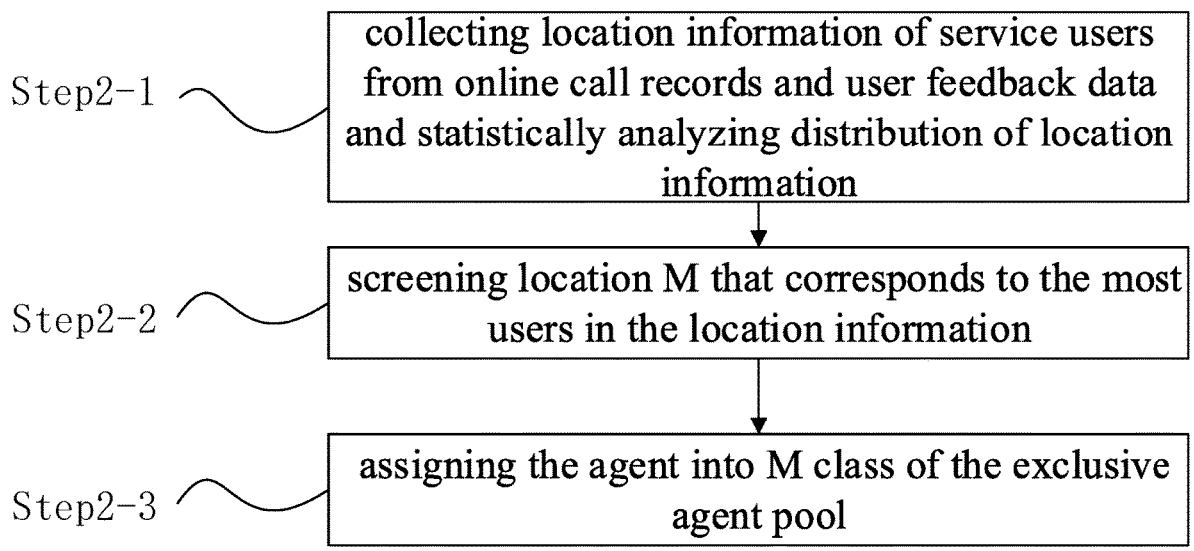
FIG. 2 shows a flowchart of an exclusive agent pool allocation method according to an embodiment of the application.

Refer to FIGS. 1 and 2, it is shown an exclusive agent pool allocation method, comprising the following steps:

Step 01 of collecting business data of agents;

on-line call records on agent providing business consultation and business processing are collected during period T, and business data such as response time, business amount and so on of the agent is sought from the on-line call records. Location information to which the user belongs, user level, business type, user evaluation and other business information is obtained from user feedback data. The period T is selected according to an amount of samples of the business data actually collected, for example, amount of samples of the data in a quarter is more than 500.

Step 02 of grouping agents according to the business data of the agents and forming multiple exclusive agent pools;

Step 2-1 of collecting location information of service users from online call records and user feedback data and statistically analyzing distribution of the location information;

Step 2-2 of screening location M that corresponds to the most users in the location information;

Step 2-3 of assigning the agent into M class of the exclusive agent pool.

Specifically, the location information to which the user belongs served by each agent is counted according to annotations or information of the user's response in the call records between the agent and the user. The location information to which the user belongs is based on the branch or head office where the user handles the business, and if the user handles the business in the Shanghai branch, then the location information of the user is Shanghai Branch, and if the user handles the business in the Beijing branch, then the location information of the user is Beijing Branch. The number of users in each location is counted, and corresponding location with largest number of users is screened out, e.g., if the number of users from Beijing Branch under the name of agent X is most, the agent X is allocated to exclusive agent pool of the Beijing Branch, and if the number of users from Beijing Branch and Shanghai Branch under the name of agent Y is same and most, the agent Y is allocated to exclusive agent pools of the Beijing Branch and Shanghai Branch.

Step 03 of calculating business skill values of agents according to the business data of the agents and classifying priorities of the agents;

Business information in the call record of agent is collected and statistically classified, and the business skill value of the agents under each business type is calculated. Average business skill value of the agents is calculated according to the weight of each business type, and the agents are prioritized according to the average business skill value of the agents. Specific business types include life insurance, endowment insurance, health insurance and property insurance.

The agent's business skill values under each type of business represent the agent' expertise in this type of service. In an embodiment, a linear average weighted algorithm is used for three parameters of traffic, response time and user evaluation of agent, which are multiplied by respective weighted proportions and then added together to get the final business skill value, average business skill value is obtained by multiplying the business skill values of each business type by the weight proportion of the business type and adding them. In other embodiments, the business skill values of the agents can also be obtained by choosing other business parameters for linear average weighting calculation according to the actual application needs.

Formula for calculating the value of specific business skills is as follows:

$$f(x, y, z, \ldots) = \sqrt[2]{k_x\left(\frac{x-\tilde{x}}{\Delta_x}\right)^2 + k_y\left(\frac{y-\tilde{y}}{\Delta_y}\right)^2 + k_z\left(\frac{z-\tilde{z}}{\Delta_z}\right)^2 + \ldots},$$

$$\text{wherein } \tilde{x} = \frac{\sum_{i=1}^{N} x_i}{N}; \tilde{y} = \frac{\sum_{i=1}^{N} y_i}{N}; \tilde{z} = \frac{\sum_{i=1}^{N} z_i}{N}$$

$f(x, y, z, \ldots)$ is agent business skill value function;

N is total number of agents;

$x_i$, $y_i$, $z_i$ represent amount of business, user rating, and response time, respectively;

$\tilde{x}$, $\tilde{y}$, $\tilde{z}$ represent average amount of business of agent, average of user ratings and average of response time respectively;

$\Delta_x$, $\Delta_y$, $\Delta_z$ represent dimensions of agent business amount processing, user rating processing, and response time respectively;

$k_x$, $k_y$, $k_z$ represent weight coefficients of different assessment indexes, and are usually selected according to the needs of each department.

Step 04 of classifying priorities of agent pools according to the business data of the exclusive agent pools;

The priority of the exclusive agent pool is dynamically adjusted and classified according to the location information to which the calling user belongs. If the location information of the calling user is the Shanghai branch, the exclusive agent pool of the Shanghai branch is automatically adjusted to the highest priority agent pool. The agent pool of the branch around the Shanghai branch is arranged in turn.

Step 05 of allocating calling user to the corresponding agent in the exclusive agent pool according to predetermined allocation strategy.

According to the location information M of the calling user, the user is preferentially assigned to the M class of exclusive agent pool.

The user end sends a service request to the call center, such as by dialing telephone number of the call center, which determines the basic information of the calling user through automatic voice prompt or manual service, and according to the location information provided by the user, first assigns the calling user to the exclusive agent pool matched with his location, screens the free agents in the exclusive agent pool, and preferentially assigns an agent with best business skills value matching business handle for the user. If there is no agent with matched business, the user will be assigned to an agent with highest priority. If the calling user is located in Beijing branch, the call center will assign the user to the exclusive agent pool of Beijing branch first, and then screens the agent with the highest value of business skills matching with business handled for the user among the free agents, to provide services.

In other embodiments, if the screened free agents do not match the business handled for the user, the free agent with the highest average business skill value is screened to provide the corresponding service.

Embodiment 2

Figure 3:
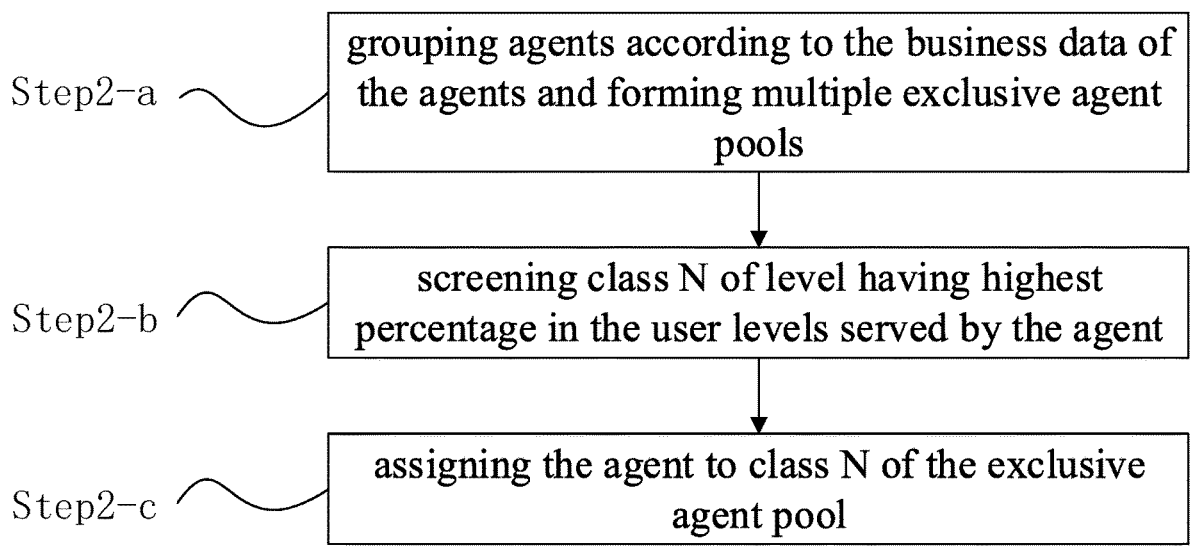
FIG. 3 shows a flowchart of an exclusive agent pool allocation method according to an embodiment of the application.

Refer to FIGS. 1 and 3, it is shown another exclusive agent pool allocation method, comprising the following steps:

Step 01 of collecting business data of agents;

business data such as on-line call records on agent providing business consultation and business processing, user feedback data, response time, business amount and so on are collected during period T. Location information to which the user belongs, user level, business type, user evaluation and other business information is obtained from above business data. The period T is selected according to an amount of samples of the business data actually collected, for example, amount of samples of the data in a quarter is more than 500.

Step 02 of grouping agents according to the business data of the agents and forming multiple exclusive agent pools;

Step 2-a of collecting user levels of service users from the online call records and user feedback data and statistically analyzing distribution of types of the levels;

Step 2-b of screening class N of level having highest percentage in the user levels served by the agent;

Step 2-c of assigning the agent to class N of the exclusive agent pool.

Specifically, the back-end data center will classify and label the calling users according to their personal information such as deposit information, personal credit information, wealth management product information, loan information, and other personal information, and mainly divided them into three categories of users, class A for high-quality customers, class B for potential customers, class C for ordinary users. According to the notes in the agent call records or label automatically identified by system, the user level of each agent is classified for statistics, and user N of level with the highest proportion of user levels of the service is screened, and the user N is at least one of the A, B, C levels. If proportion of users of class A in the user level served by the agent X is highest, then the agent X is classified into the exclusive agent pool of class A. If proportions of users of classes A and B in the user levels served by the agent Y are highest and same, then the agent Y is classified into the exclusive agent pools of classes A and B at same time.

Step 03 of calculating business skill values of agents according to the business data of the agents and classifying priorities of the agents;

Classes of user level in the call record of agent is collected and statistically classified, and the business skill value of the agents under each business type is calculated. Average business skill value of the agents is calculated according to the weight of each business type, and the agents are prioritized according to the average business skill value of the agents.

In an embodiment, a linear average weighted algorithm is used for users of three levels business skill values on user of each level is obtained from linear average weighting three parameter of traffic, response time and user evaluation of the level, which are multiplied by respective weighted proportions and then added together to get the final business skill value, average business skill value is obtained by multiplying the business skill values of each business type by the weight proportion of the business type and adding them. In other embodiments, the business skill values of the agents can also be obtained by choosing other business parameters for linear average weighting calculation according to the actual application needs.

Step 04 of classifying priorities of agent pools according to the business data of the exclusive agent pools;

The priority of the exclusive agent pool is dynamically adjusted and classified according to the user level of the calling user. If the level of the incoming user is Class A, the exclusive agent pool of Class A is automatically adjusted to the highest priority agent pool. If the level of incoming users is class C, the class C exclusive agent pool is automatically adjusted to the highest priority agent pool.

Step 05 of allocating calling user to the corresponding agent in the exclusive agent pool according to predetermined allocation strategy.

According to the user level N of the calling user, the user is preferentially assigned to the N class of exclusive agent pool.

The user end sends a service request to the call center, such as by dialing telephone number of the call center, which determines the basic information of the calling user through automatic voice prompt or manual service, and according to class of user level provided by the user, preferentially assigns the calling user to the exclusive agent pool matched with his level, screens the free agents in the exclusive agent pool, and preferentially assigns an agent with best business skills value and matching with the user level. If there is no agent with matched business, the user will be assigned to an agent with highest priority.

In other embodiments, if the screened free agents do not match the business handled for the user, the free agent with the highest average business skill value is screened to provide the corresponding service.

Embodiment 3

Referring to FIGS. 4 to 6, an exclusive agent pool allocation system 20 is illustrated. In this embodiment, the exclusive agent pool allocation system 20 is divided into one or more program modules, which are stored in a storage medium, and executed by one or more processors to complete the application. A program module for the purpose of this application is a series of computer program instruction segments capable of performing a specific function, which is more suitable than the program itself to describe the execution of the exclusive agent pool allocation system 20 in a storage medium. The following descriptions will introduce in detail the functions of each program module in this embodiment:

a data acquisition module 201 adapted to collect business data of agents, collect business data such as on-line call records on agent providing business consultation and business processing, user feedback data, response time, business amount and so on during period T, and obtain Location information to which the user belongs, user level, business type, user evaluation and other business information from above business data.

an agent grouping module 202 adapted to group agents according to the business data of the agents and form multiple exclusive agent pools, group the agents by collecting the location information of the users and user level information and form multiple exclusive agent pools;

an agent priority classification module 203 adapted to prioritizing the agents according to the business data of the agents;

In a preferable embodiment, the agent priority classification module 203 includes a first classification sub-module 2031 and a second classification sub-module 2032. The first classification sub-module 2031 is for calculating business skill values of agents according to the business data of the agents and classifying priorities of the agents, that is, business information in the call record of agent and user feedback is collected and statistically classified, and the business skill value of the agents under each business type is calculated. Average business skill value of the agents is calculated according to the weight of each business type, and the agents are prioritized according to the average business skill value of the agents. The second classification sub-module 2032 is for calculating business skill values of agents according to the business data of the agents and classifying priorities of the agents, that is, classes of user level in the call record of agent and user feedback is collected and statistically classified, and the business skill value of the agents under each business type is calculated. Average business skill value of the agents is calculated according to the weight of each business type, and the agents are prioritized according to the average business skill value of the agents.

an agent pool priority classification module 204 adapted to classify priorities of the agent pools according to the business data of the exclusive agent pools; In a preferred embodiment, the priority of the agent pool is dynamically classified according to the location information of the incoming user or the user level;

an agent pool allocation module 205 adapted to allocate incoming user to the agent with corresponding priority according to predetermined allocation policy.

In a preferable embodiment, the agent pool allocation module 205 includes a first allocation sub-module 2051 and a second allocation sub-module 2052. The first allocation sub-module 2051 is for allocating the user to corresponding exclusive agent pool according to location information to which the user belongs; the second allocation sub-module 2052 is for allocating the user to an agent with higher priority in the exclusive agent pool with according to priorities of agents.

Embodiment 4

Figure 7:
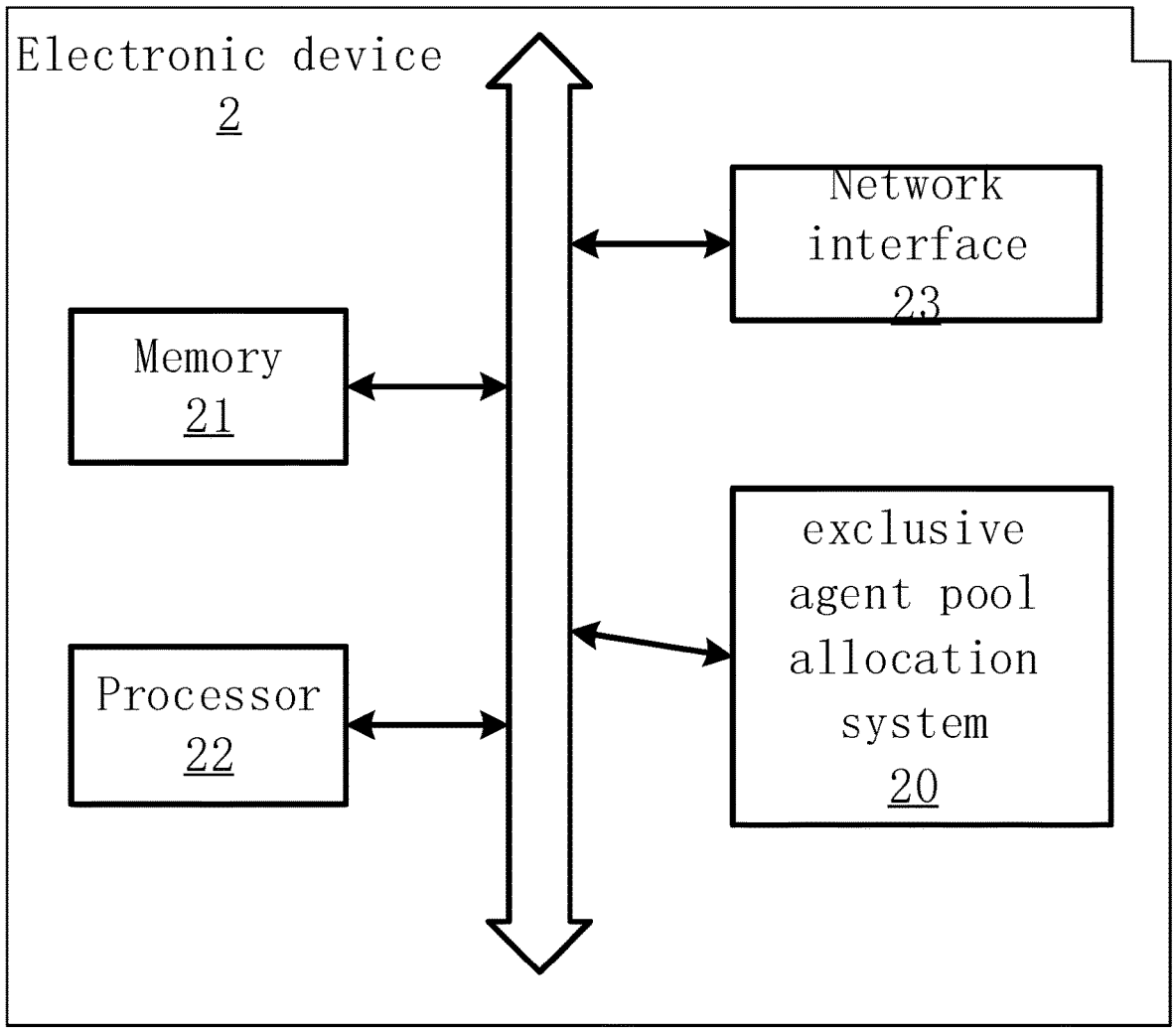
FIG. 7 shows a diagram of hardware architecture of an electronic device according to an embodiment of the application.

Referring to FIG. 7, this embodiment provides an electronic device, a schematic diagram of the hardware architecture of an electronic device of the embodiment of the application is shown. In this embodiment, the electronic device 2 is a device capable of automatically performing numerical calculations and/or information processing according to predefined or stored instructions. For example, it can be a smartphone, tablet, laptop, desktop computer, rack server, blade server, tower server, or cabinet server including stand-alone servers. Or a cluster of multiple servers), and so on. As shown, the electronic device 2 includes, but is not limited to, a memory 21, a processor 22, a network interface 23, ID card identification instrument 24, high camera 25 and an exclusive agent pool allocation system 20 that can be communicated with each other through a system bus, in which:

The memory 21 includes at least one type of computer-readable storage medium. The readable storage medium includes flash memory, hard disk, multimedia card, card type memory (e.g., SD or DX memory, etc.), random access memory (RAM), static random-access memory (SRAM), read only memory (ROM), electrically erasable. Programmable read-only memory (EEPROM), programmable read-only memory (PROM), magnetic memory, magnetic disk, optical disk, etc. In some embodiments the memory 21 may be an internal storage module of the electronic device 2 such as a hard disk or memory of the electronic device 2. In other embodiments, the memory 21 may also be an external storage device of the electronic device 2, such as a plugged hard disk provided on the electronic device 2, an intelligent memory card (Smart Media Card, SMC), secure digital (Secure Digital, SD) card, a flash memory card (Flash Card), and the like. Of course the memory 21 may also include both an internal storage module and an external storage device of the electronic device 2. In this embodiment, the memory 21 is generally used to store an operating system and various types of application software installed in the electronic device 2 such as the program code of the exclusive agent pool allocation system 20 and the like. In addition, the memory 21 may also be used to temporarily store various types of data that have been or will be outputted.

The processor 22 may in some embodiments be a central processor (CPU), a controller, a microprocessor, or other data processing chip. The processor 22 is generally used to control the overall operation of the electronic device 2 such as performing control and processing related to data interaction or communication with the electronic device 2. In this embodiment, the processor 22 is used to run program code stored in the memory 21 or process data such as running the exclusive agent pool allocation system 20 or the like.

The network interface 23 may include a wireless network interface or a wired network interface which is generally used to establish a communication connection between the electronic device 2 and other electronic devices. For example, the network interface 23 is used for connecting the electronic device 2 to an external terminal via a network establishing a data transmission channel and a communication connection between the electronic device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and the like.

It is to be noted that FIG. 7 shows only an electronic device having components 20-23 but it is understood that it is not required to implement all of the shown components and that more or fewer parts can be implemented in lieu thereof.

In this embodiment, the exclusive agent pool allocation system 20 stored in memory 21 may also be divided into one or more program modules, said one or more program modules being stored in memory 21, and executed by one or more processors (in this embodiment, processor 22) to complete the application.

For example, FIG. 4 shows a schematic diagram of a program module of the first embodiment of the exclusive agent pool allocation system 20, in which the exclusive agent pool allocation system 20 may be divided into a data acquisition module 201, an agent grouping module 202, an agent priority classification module 203, an agent pool priority classification module 204 and an agent pool allocation module 205. The program module referred to in this application refers to a series of computer program instruction segments capable of accomplishing a specific function, and is more suitable than a program to describe the execution process of the exclusive agent pool allocation system 20 in the electronic device 2. The specific functions of the program module 201-205 have been described in detail in embodiment 3 and are not repeated here.

Embodiment 5

This embodiment provides a computer-readable storage medium. The exclusive agent pool allocation system 20 is stored on the computer-readable storage medium. When the exclusive agent pool allocation system 20 is executed by one or more processors, the exclusive agent pool allocation agent matching system 20 realizes the operation of the exclusive agent pool allocation agent matching method or electronic device.

Through the description of the above embodiments it is clear to those skilled in the art that the above embodiments may be implemented by means of software plus the necessary common hardware platform and of course by hardware. But in many cases the former is the better way to do it.

Not limited hereto, any change or substitution which is not the result of creative labor shall be covered by this application. Therefore, the scope of protection of this application shall be subject to the scope of protection limited by the claim.

What is claimed is:

1. A method of allocating exclusive agent pools comprising:
    collecting business data of agents;
    grouping each agent according to at least a portion of the business data into one of exclusive agent pools;
    calculating business skill values of each of the agents according to at least a portion of the business data and classifying one or more priorities of each of the agents;
    classifying one or more priorities of each of the exclusive agent pools according to at least a portion of the business data of each of the agents in each of the exclusive agent pools; and
    allocating an incoming service user to a particular agent in one of the exclusive agent pools according to a predetermined allocation strategy.

2. The method of claim 1, wherein the business data of agents comprises on-line call records and service user feedback data for business consultation and business handling by the agent for the service user during a period T.

3. The method of claim 2, wherein grouping each agent into one of the exclusive agent pools comprises:
    collecting location information of service users from the on-line call records and service user feedback data, and statistically analyzing distribution of the location information;
    screening a location M that corresponds to the most service users in the location information; and
    assigning the agent into the exclusive agent pool associated with location M.

4. The method of claim 2, wherein grouping each agent into one of the exclusive agent pools comprises:
    collecting service user levels of service users from the on-line call records and service user feedback data, and statistically analyzing distribution of types of the service user levels;
    screening a class N of service user level that corresponds to the highest percentage in the service user levels served by the agent; and
    assigning the agent into the exclusive agent pool associated with the class N.

5. The method of claim 2, wherein calculating the business skill values of each of the agents and classifying each of the priorities of each of the agents comprises:
    collecting business volume, response time, and service user evaluation data of each of the agents;
    performing classification statistics on at least a portion of the business volume, response time, and service user evaluation data of each of the agents;
    calculating business skill values of each of the agents for each business type;
    calculating average business skill values of each of the agents based on a weight of each business type; and
    prioritizing each of the agents according to levels of the average business skill values of each of the agents.

6. The method of claim 2, wherein calculating the business skill values of each of the agents and classifying each of the priorities of each of the agents comprises:
    collecting service user levels of service users from on-line call records and service user feedback data of each of the agents;
    performing classification statistics on at least a port of the service user levels;
    calculating business skill values of each of the agents under every level of service users;
    calculating average business skill values of each of the agents based on a weight of each level of service users; and
    prioritizing each of the agents according to levels of the average business skill values of each of the agents.

7. The method of claim 1, wherein allocating the incoming service user comprises preferentially assigning each service user according to at least a portion of each of the priorities of the exclusive agent pools and at least a port of each of the priorities of the agents.

8. A non-transitory computer readable storage medium, wherein the non-transitory computer readable storage medium stores an exclusive agent pool allocation system, and the exclusive agent pool allocation system executed by at least one processor to achieve the following steps:
    collecting business data of agents;
    grouping agents according to the business data of the agents and forming exclusive agent pools;
    calculating business skill values of the agents according to the business data of the agents and classifying priorities of the agents;
    classifying priorities of exclusive agent pools according to the business data of the exclusive agent pools; and
    allocating an incoming service user to the corresponding agent in the corresponding exclusive agent pool according to predetermined allocation strategy.

9. The non-transitory computer readable storage medium of claim 8, wherein collecting business data of agents comprises: collecting on-line call records and service user feedback data for business consultation and business handling by the agent for the service user during a period T.

10. The non-transitory computer readable storage medium of claim 9, wherein grouping agents according to the business data of the agents and forming exclusive agent pools comprise:
    collecting location information of service users from on-line call records and service user feedback data and statistically analyzing distribution of the location information;
    screening a location M that corresponds to the most service users in the location information; and
    assigning the agent into an M class of the exclusive agent pool.

11. The non-transitory computer readable storage medium of claim 9, wherein grouping agents according to the business data of the agents and forming exclusive agent pools comprises:

collecting service user levels of service users from the on-line call records and service user feedback data and statistically analyzing distribution of types of the levels;

screening a class N of level having the highest percentage in the service user levels served by the agent; and assigning the agent to a class N of the exclusive agent pool.

12. The non-transitory computer readable storage medium of claim 9, wherein calculating business skill values of agents according to the business data of the agents and classifying priorities of the agents comprises: collecting business volume, response time, service user evaluation data of agents and performing classification statistics on the business volume, response time, service evaluation data of the agents, calculating business skill values of agents for each business type, calculating average business skill values of the agents based on weight of each type of business, and prioritizing agents according to levels of the average business skill values of the agents.

13. The non-transitory computer readable storage medium of claim 9, wherein calculating business skill values of agents according to the business data of the agents and classifying priorities of the agents comprises: collecting service user levels of service users from online call records and service user feedback data of agents, performing classification statistics on the service user levels, calculating business skill values of agents under every level of service users, calculating average business skill values of agents based on weight of each level of service users, and prioritizing agents according to levels of the average business skill values of the agents.

14. The non-transitory computer readable storage medium of claim 8, wherein allocating incoming service users to the corresponding agent in the corresponding exclusive agent pool according to predetermined allocation strategy comprises: preferentially assigning the service users according to priorities of the exclusive agent pools and priorities of the agents.

\* \* \* \* \*